(12) United States Patent
Yebka et al.

(10) Patent No.: US 11,905,441 B2
(45) Date of Patent: Feb. 20, 2024

(54) DELAYED ADHESIVE ACTIVATION (71) Applicant: Lenovo (Singapore) PTE. LTD., New Tech Park (SG)

(72) Inventors: Bouziane Yebka, Apex, NC (US); Tin-Lup Wong, Chapel Hill, NC (US); Philip J. Jakes, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/404,644

(22) Filed: Aug. 17, 2021

(65) Prior Publication Data

US 2023/0054147 A1  Feb. 23, 2023

(51) Int. Cl.
| | |
|---|---|
| *C09J 5/06* | (2006.01) |
| *B32B 7/12* | (2006.01) |
| *B32B 37/12* | (2006.01) |
| *B32B 38/00* | (2006.01) |
| *C09J 201/00* | (2006.01) |
| *C09J 5/00* | (2006.01) |

(52) U.S. Cl.
CPC ............... *C09J 5/06* (2013.01); *B32B 7/12* (2013.01); *B32B 37/1284* (2013.01); *B32B 38/0008* (2013.01); *C09J 5/00* (2013.01); *C09J 201/00* (2013.01); *B32B 2037/1253* (2013.01); *B32B 2037/1269* (2013.01); *B32B 2305/72* (2013.01); *B32B 2310/0831* (2013.01); *B32B 2457/00* (2013.01); *B32B 2457/20* (2013.01); *C09J 2301/124* (2020.08); *C09J 2301/30* (2020.08); *C09J 2301/416* (2020.08)

(58) Field of Classification Search
CPC ..... C09J 5/06; C09J 5/00; C09J 201/00; C09J 2301/124; C09J 2301/30; C09J 2301/416; B32B 7/12; B32B 37/1284; B32B 38/0008; B32B 2037/1253; B32B 2037/1269; B32B 2305/72; B32B 2310/0831; B32B 2457/00; B32B 2457/20; B29C 65/48
See application file for complete search history.

(56) References Cited

U.S. PATENT DOCUMENTS 5,897,722 A * 4/1999 Bright ................... B65C 9/1823
156/308.2

\* cited by examiner

*Primary Examiner* — Daniel H Lee
(74) *Attorney, Agent, or Firm* — Kunzler Bean & Adamson (57) ABSTRACT

Apparatuses, methods, and systems are disclosed for an adhesive including an activated portion and an unactivated portion. The adhesive is interposed between and binds the first substrate to a second substrate. The unactivated portion includes moisture, and the activated portion is activated to adhere in response to the removal of moisture. Similarly, the unactivated portion of the adhesive may be activated in response to the removal of moisture, removal of air, applying radiation, heating, and/or catalyzing a functional group.

12 Claims, 5 Drawing Sheets

DELAYED ADHESIVE ACTIVATION

FIELD

The subject matter disclosed herein relates to adhesive activation and more particularly relates to controlled activation and/or modification of delayed adhesive materials.

BACKGROUND

Double-sided tape has a pressure-sensitive adhesive that has many benefits in the assembly of computing devices, particularly when several small components or parts are fastened. For example, a computer keyboard assembly has an upper keyboard coupled to a frame and may use fasteners or screws to align the components. The use of double-sided tape may reduce the number of screws but has a pressure-sensitive adhesive exposed on both sides of the tape. The keyboard and the frame may also use double-sided pressure-sensitive tape to capture or align the keys and other components of the keyboard assembly. When a conventional pressure-sensitive adhesive aligns multiple components, the simultaneous alignment of various aspects of the adhesive can become unwieldy. In addition, early contact adhesion or bonding can make correcting any misalignments difficult, time-consuming, and/or expensive. For example, fixing a misalignment between the keyboard and the frame, or components of a frame, may frustrate or challenge assembly when the adhesive has prematurely and/or improperly adhered to one or more components. An adhesive is sought that delays adhesion to enhance the alignment of the various parts and facilitates realignment prior to bonding. Additional control over the timing, flexibility, duration, and/or the location of the adhesion of the double-sided tape is disclosed.

BRIEF SUMMARY

Apparatuses, methods, systems, and program products are disclosed for an adhesive with controlled delayed activation. In one embodiment, an apparatus having a first substrate and a second substrate is described. An adhesive comprising an activated portion and an unactivated portion is interposed between the first substrate and the second substrate. The unactivated portion comprises moisture and the activated portion is activated portion is active in response to removal of moisture. The activated portion couples and adheres to at least one of the first substrate and the second substrate.

Disclosed is a method of joining two or more substrates. The method includes aligning a deactivated adhesive between a first substrate and a second substrate and activating a portion of the deactivated adhesive between the first substrate and the second substrate to remove moisture, remove air, and apply radiation, or catalyzing a functional group. A bond is formed between the first substrate and the second substrate in response to the portion of the activated portion of the adhesive. The activated portion surrounds an unactivated portion of the adhesive In another embodiment, a method of bonding substrates is disclosed. The method involves coating a first substrate or a binder with a first deactivated adhesive and coating a second substrate or the binder with a second deactivated adhesive. The first substrate is aligned relative to the second substrate about the binder, interposed between the first substrate and the second substrate. A portion of the first deactivated adhesive is activated in response to the removal of moisture. A portion of the second deactivated adhesive is activated in response to the removal of air, applying radiation, heating, or catalyzing a functional group. The first and second adhesives create a composite adhesive with an unactivated portion and an activated portion.

BRIEF DESCRIPTION OF THE DRAWINGS

A more detailed description of the embodiments briefly described above is rendered by reference to specific embodiments illustrated in the appended drawings. The drawings depict only some embodiments and are not limiting of scope. The embodiments are described and explained with additional specificity and detail with the accompanying drawings, in which.

DETAILED DESCRIPTION

When assembling a multifaceted device, a pressure-sensitive adhesive may reduce the number of parts in the assembly and provide a method to attach components of the device. For example, double-sided tape is a pressure-sensitive binder that reduces and/or eliminates the number of screws used to assemble a keyboard for a computing device. However, double-sided tape is pressure-sensitive and can prematurely or accidentally bind to either the wrong part or the wrong area of the correct part. Correcting this premature misalignment can be difficult. For example, realigning the tape may require removal, replacement, and the new parts/adhesive material. In other words, conventional pressure-sensitive tapes can result in time delays and/or material waste.

The present disclosure concerns an apparatus and a method that permit the user/manufacturer greater time and flexibility in the assembly process. For example, delaying the adhesion of the adhesive prevents premature contact adhesion and reduces misalignment. Control over where the adhesion occurs, the type of adhesive properties, and whether the bond formed by the adhesive is permanent or temporary can also be provided by controlling properties of the adhesive. The controlled adhesive can delay adhesion and/or define/restrict adhesive areas to enhance the alignment and facilitate realignment prior to bonding. Additional user control over the timing, flexibility, duration, and/or the adhesion location is also described and allows the user to customize the desired properties for the desired function of the adhesive.

Figure 1:
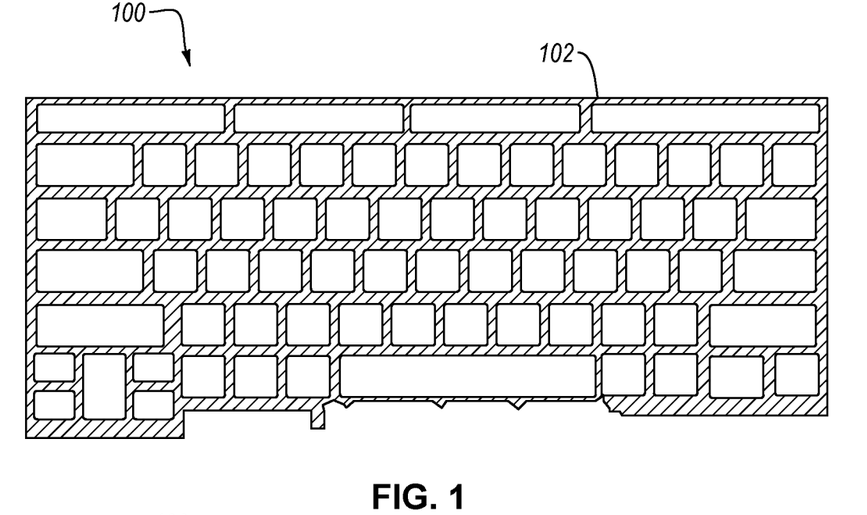
FIG. 1 is a delay controlled double-sided adhesive for a keyboard illustrating one embodiment of a system for controlled and delayed adhesion.
Figure 2:
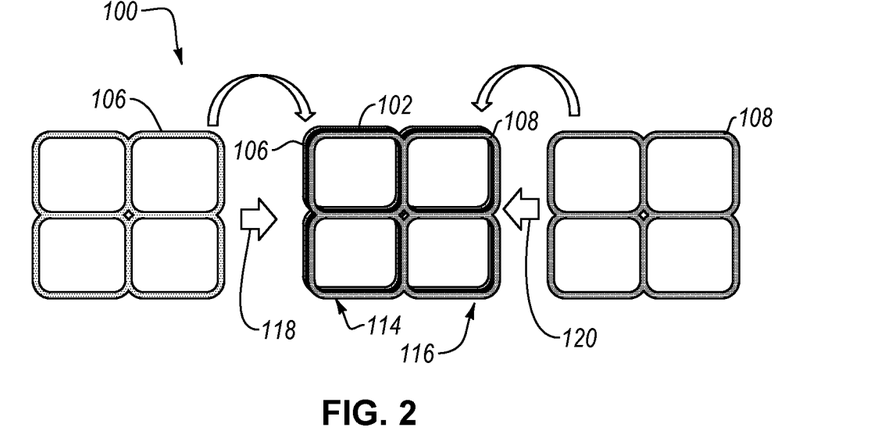
FIG. 2 is a schematic diagram illustrating one embodiment of an apparatus formed through a controlled adhesive activation of the adhesion properties.
Figure 3A:
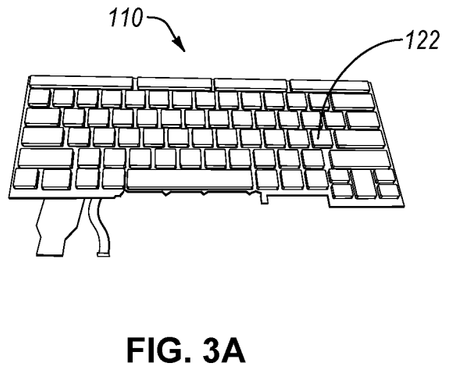
FIG. 3A illustrates one embodiment of a keyboard without a frame.
Figure 3B:
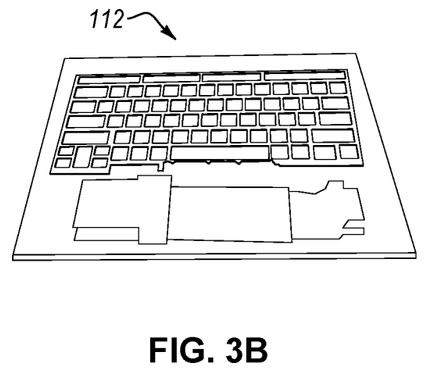
FIG. 3B illustrates one embodiment of a frame for the keyboard of FIG. 3A.

FIG. 1 shows an embodiment of an apparatus 100 joined, adhered, or bonded by an adhesive 102 that can be controlled and/or delayed. The delayed adhesive enables the formation of a bond 104 with adhesion properties that are delayed before the adhesive 102 couples a first substrate 106 to a second substrate 108, as shown in FIG. 2. The first substrate 106 may have a mating configuration with the second substrate 108. The mating configurations facilitate bonding by securely joining the delayed adhesive 102 to the substrates. For example, FIGS. 3A and 3B show the first substrate 106 as a keyboard 110 supported by a frame 112, as the second substrate 108, in a specific embodiment. The delayed and controlled adhesive formed the bond 104 between the keyboard 110 and the frame 112.

The delayed adhesive 102 provides control to the timing, flexibility, duration, and/or the location of the adhesion properties between the keyboard 110 and the frame 112. In other words, controlling the time needed for the adhesive 102 to form the bond 104 can adjust the flexibility or rigidity/inflexibility of the bond 104 between the first substrate 106 and the second substrate 108 is enhanced. The controlled bond 104 is designed and/or customized for the function of the apparatus 100, e.g., whether a stiff//rigid joint or a flexible/malleable joint is better suited for the device.

Similarly, the duration of the bond 104 is designed for the apparatus by determining whether the bond 104 is a permanent joint 114 or a temporary attachment 116. As described below, the type of bond 104 created may be controlled with a photo-initiator 118 and/or a promoter 120. The photo-initiator 118 and promoter 120 control the relative activation of the adhesive 102. The permanent joint 114 needs a new adhesive 102 if the substrates are separated, whereas the temporary attachment permits separation and rejoining the substrates. The delayed adhesion properties of the adhesive may enhance the relative location/alignment of the substrates because adhesion does not occur until after verification of the alignment and location of the bond 104.

The first substrate 106 and the second substrate 108 may form the bond 104 by direct contact to the adhesive 102 captured between the substrates with the permanent joint 114. In this configuration, the first substrate 106 and the second substrate 108 are bonded/adhered until the adhesive 102 is removed or broken. Once separated, a new reapplied adhesive 102 is needed to recreate the bond 104 between the first substrate 106 and the second substrate 108.

The adhesive 102 defines whether the bond 104 is a permanent joint 114 or semi-permanent-releasable, shown as temporary attachment 116. The permanent joint 114 may be less flexible than the temporary attachment 116. In other words, the methods disclosed herein enable a user to modify the nature and adhesion properties of the adhesive 102 that forms the bond 104 between the substrates. The adhesive 102 can create a bond 104 for the desired structure and function of the apparatus 100. Changes to the adhesive 102 may affect the stability, flexibility, or inflexibility of the bond 104 formed by the adhesive 102 and/or whether the attachment is a permanent joint 114 or a temporary attachment 116. In other words, variable adhesion properties of the bond are designed for the application along a continuous scale. The adhesive facilitates customization of the stability, longevity, and adhesion of the adhesive 102 for the particular design and/or function. Activation of the delayed adhesive 102 to form the bond 104 enhances the control of the bond location and the alignment of the joint.

As shown in FIGS. 3A and 3B, the first substrate 106 includes some part of the keyboard 110, e.g., a bonding surface on a key 122, and the second substrate is a bonding surface on the frame 112 that captures and/or supports the keyboard 110. For example, the adhesive 102 attaches the key 122 to a spring coupled to the frame 112 of the keyboard 110 and joins other bonding surfaces of the keyboard 110 to the frame 112.

In some embodiments, the keyboard 110 couples to and/or supports the key 122 to perform the desired function (e.g., flex when typing). In other words, the keyboard 110 may include the frame 112 (e.g., a substrate) extending over the keyboard 110 (e.g., another substrate) to capture and/or support the keys 122. The adhesive 102 may adhere the frame 112 to the keyboard 110 and parts of the keyboard 110, such as the key 122. In other words, numerous bonding sites may exist between the first substrate ## and the second substrate 108. Increases in the number of binding sites or components (e.g., the keyboard 110 and/or frame 112 as the substrates) joined/coupled to the frame 112 (e.g., the second substrate 108) increases the alignment complexity. The delay of the adhesion properties for the adhesive 102 enables the assembler to control the bond 104 location and the alignment of the numerous substrates.

When the assembled apparatus 100 involves joining numerous keys 122 of the keyboard 110 to the frame 112, the first substrate 106 and/or the second substrate 108 may capture the keys 122. When a user of the keyboard 110 depresses the key 122 coupled to and supported by the frame 112, the bond 104 formed by adhesive 102 is partially activated. When compressed, the adhesive 102 may deflect in a flexible manner.

The delayed adhesive 102 enhances the control of adhesion properties in the bond 104. When adhered to the substrates, the bond 104 formed on the substrates by the adhesive 102 forms a flexible or temporary bond 104. The manufacturer/assembler can control the delayed adhesive 102 during assembly of the apparatus 100. In some embodiments, the adhesive 102 is controlled by adding or removing moisture, air, and/or inert gas. In other words, the adhesive 102 has adhesion properties that can be controlled by chemical methods rather than mechanical application, or pressure sensitivity. A chemical molecule, such as water, can be used (added or removed) to promote and/or catalyze a functional group of the adhesive 102.

Similarly, a photo-initiator 118, such as radioactive waves, photons, or photo-promoters, can chemically transform a chemical functional group of the adhesive 102 to alter the adhesion properties of the adhesive 102. The photo-initiator 118 and/or promoter 120 converts an unactivated portion 124 of the adhesive 102 into an activated portion 126 to modify the adhesion properties of the bond 104 joining two or more substrates. In various embodiments, photo-initiators 118 include UV light, visible light, or other electromagnetic radiation wavelengths/frequencies that provide the activation energy to transform the functional group of the adhesive 102 chemically. This creates a delayed adhesive 102 that does not immediately join or bond to the substrates.

Instead, the adhesive 102 has an activated portion 126 and an unactivated portion 124 and creates a designed bond 104 with designed adhesion properties along a continuum between the first substrate 106 and the second substrate 108.

Adhesive properties, including the timing, flexibility, duration, or bond location, are initiated by the promoter 120 and/or the photo-initiator 118 along a continuum. The specific application and functional features of the bond 104 are designed and/or assembled for the particular apparatus 100. The activated portion 126 may extend along a perimeter 128 of the bond 104. The perimeter 128 partially or surrounds the unactivated portion 124 of the adhesive 102. For example, radiation methods using a photo-initiator 118 can activate the adhesive 102 by exposing the assembled apparatus 100 to photo-initiators 118 once the substrates are correctly aligned.

The duration of the exposure to the photo-initiator 118 may determine the size/volume of the activated portion 126 about the perimeter 128. At least initially, the unactivated portion 124 may be greater than the activated portion 126 to temporarily and flexibly adhere/couple the substrates. The relative size and/or volume of the unactivated portion 124 is initially greater than the activated portion 126 to permit 'tacking' the assembly for inspection prior to forming a permanent joint 114. Alternatively, the bond 104 that attaches the substrates may be designed with different activated portions 126 and unactivated portions 124. The relative sizes of the activated portion 126 and the unactivated portions 124 can be used to control the adhesive properties of the bond 104. In various embodiments, removing moisture or air, radiating, heating, and/or catalyzing a functional group of the unactivated adhesive 102 activates at least a portion of the adhesive 102 (e.g., the activated portion 126).

In this way, combining the activated portion 126 and the unactivated portion 124 in the bond 104 can form a flexible composite adherend 130. A composite adherend includes both an unactivated portion 124 and an activated portion 126. The composite adherend 130 may be more or flexible (or inflexible) along a continuum, depending on the ratio of the unactivated portion 124 to the activated portion 126 in the bond 104. The adhesive 102 in the bond 104 enjoys controllable and variable adhesive properties along a continuum to enhance the functional design of the joint due to the interactions of the activated portion 126 with the unactivated portion 124. In other words, the relative size and/or volume of the unactivated portion 124 relative to the activated portion 126 can control the adhesive properties of the bond 104.

Figure 4:
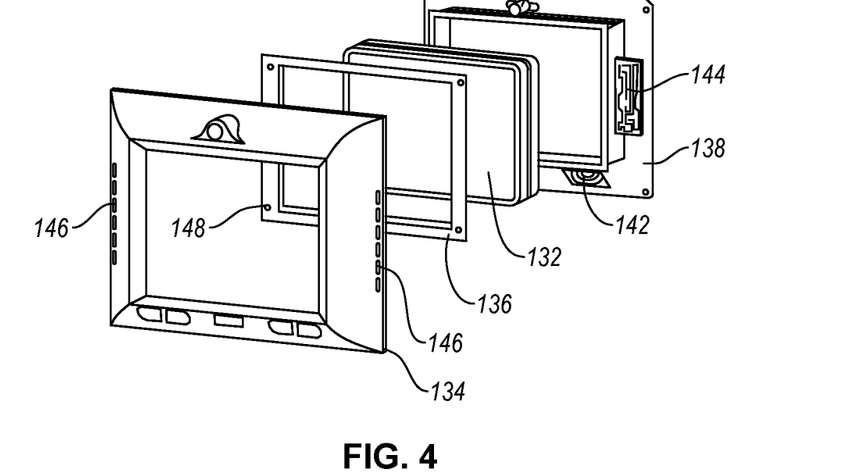
FIG. 4 is an exploded perspective view of one embodiment of a screen.

FIG. 4 is an exploded view of a screen 132. The screen 132 is another apparatus 100 that is coupled together, at least in part, by the delayed and controlled adhesive 102. The screen 132 has an outer fairing 134, an inner frame 136, and a base 138. As described below, the adhesion properties selected along the continuum for the screen 132 may be enhanced by using different adhesion properties than those selected for the keyboard 110 described above for FIGS. 3A and 3B.

The outer fairing 134 and inner frame 136 may be an integral structure that captures the screen 132 against the base 138. One continuous substrate (e.g., the first substrate 106) may include the outer fairing 134 and the inner frame 136. The other substrate (e.g., the second substrate 108) of the apparatus 100 may be the base 138. The screen 132 is interposed between the inner frame 136 (or outer fairing 134) and the base 138. As used herein and unless specifically indicated otherwise, the inner frame 136 is referenced, but the following description applies equally to the outer fairing 134 and/or a continuous integral outer fairing 134 and inner frame 136.

In some embodiments, the inner frame 136 and the base 138 capture the screen 132 in a more permanent joint 114 than the more temporary attachment 116 formed by the keyboard 110 above. In other words, the bond 104 capturing the screen 132 is a permanent joint 114 that enables increased peripheral components on the screen 132. Specifically, the screen 132 may include peripheral components, such as a webcam 140, a speaker 142, a processor 144, and/or I/O devices 146, such as USB ports. In various embodiments, the permanent joint 114 may facilitate and include mechanical fasteners (e.g., bolts, rivets, or screws) at fastener locations 148. In some embodiments, the adhesive 102 may reduce, replace, and/or eliminate the fastener locations 148 of the assembly through controlled application and adhesive properties of the adhesive 102. Specifically, fastener locations 148 for peripheral equipment, such as the webcam 140, may be replaced with the adhesive 102 with a more significant activated portion 126 to form a more permanent joint 114. The reduced number of fastener locations 148 may provide an additional area on the outer fairing 134 for additional peripheral components, e.g., the USB inputs and outputs or other I/O devices 146.

Figure 5:
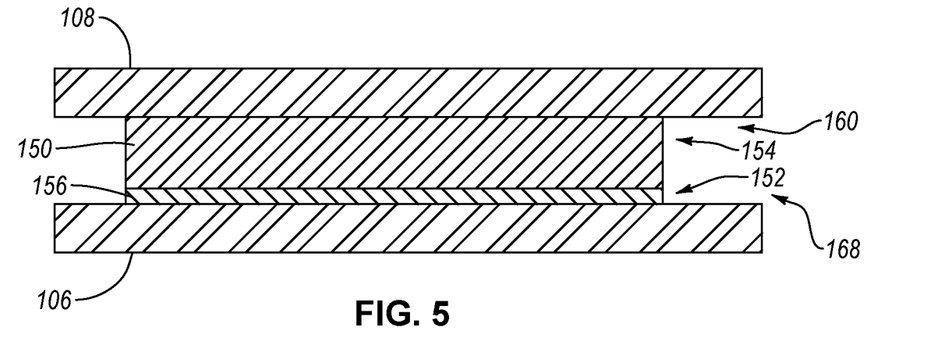
FIG. 5 depicts an example embodiment of a double-sided adhesive with a composite adherend coating layer, according to one embodiment.
Figure 6:
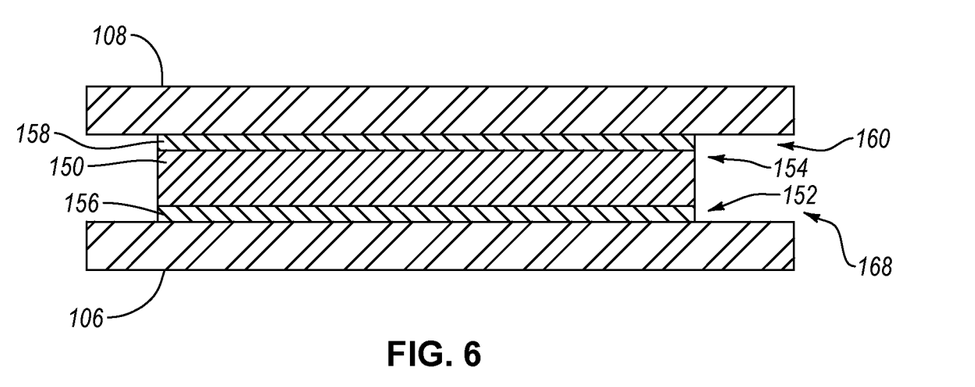
FIG. 6 depicts an example embodiment of a double-sided adhesive with two opposite composite adherents, according to one embodiment.

Regarding FIGS. 5 and 6, a binder 150 has adhesives 102 on two sides, a first side 152 and a second side 154. The binder 150 is a type of double-sided tape that enables disparate bond 104 types on either side of the tape. In other words, the binder 150 creates variable and/or different adhesion properties for the bond 104 formed with each different substrate. Specifically, unlike a pressure-sensitive tape that adheres to the substrate immediately when mechanical pressure is applied, the adhesive properties' controlled delay of the adhesive 102 facilitates adhesive layers on the binder 150 to bind to the first substrate 106 differently from the bond 104 of the second substrate 108.

FIG. 5 shows a constructed apparatus 100 with the binder 150 having a double-sided adhesive 102. The adhesive 102 defines a first adhesive layer 156 and/or a second adhesive layer 158, shown in FIG. 6. Adhesive layers between the binder 150 and the first adhesive layer and/or the second adhesive layer 158 may include adhesive 102 with delayed and/or controllable adhesive properties. FIG. 5 shows the first adhesive layer 156 interposed between the binder 150 and the first substrate 106. The second adhesive layer is absent. In other words, the binder 150 is integral to and/or coupled to the second substrate 108 by some other means, e.g., a pressure-sensitive adhesive, a weld or brazing, or with fastener locations 148. The first adhesive layer 156 includes the delayed and/or controlled activation of the adhesion properties. For example, the first adhesive layer may include adhesive 102 with an activated portion 126 and/or an unactivated portion 124. The adhesive layer 156/158 binds the first substrate 106 to the binder 150, and the binder 150 is coupled to the second substrate 108.

In various embodiments, the binder 150 may be a part of the second substrate 108, e.g., a bonding layer or attachment site. The binder may be attached to the second substrate 108 through a mechanical means, such as a press-fitting or fastener. FIG. 5 shows that the second substrate 108 binds to the binder 150 using a different binding mechanism from the first adhesive layer 156.

In one example, the binder 150 includes the activating/binding mechanism that binds the second adhesive layer 158 to the binder 150 and/or the second substrate 108. The second adhesive layer 158 may attach to the binder 150 with a conventional double-sided pressure-sensitive tape. The binder 150 is double-sided because the first adhesive layer 156 is on the first side 152, and the second layer is attached to, on, or within the binder 150 on the second side 154. The binder 150 can include a conventional pressure-sensitive tape or adherent.

A composite binder 160 may adhere to either the first substrate 106 or the second substrate 108. The composite binder 160 has different adhesives or attachment mechanisms on either side of the binder 150. The composite binder 160 may have adhesives 102 with functional groups that are different on each side. In another example, the first adhesive layer 156 has a composite adherend 130 and the second adhesive layer has a conventional pressure-sensitive adherend. The resulting composite binder 160 can be attached directly to the second substrate 108 and indirectly to the first substrate 106 (e.g., with the composite adherend 130 formed by the first adhesive layer 156). In other words, the first adhesive layer 156 enables the application of the adhesive 102 with a composite adherend 130 to coat or attach to the first substrate 106 to the binder 150. The first adhesive layer 156 may be applied as a coating to include the adhesive 102 that forms the composite adherend 130 without the binder 150.

The first adhesive layer 156 may be directly applied to or coated on either the first side 152 of the binder 150 and/or the first substrate 106. Similarly, the first adhesive layer 156 can be activated independently from the composite binder 160 to independently control the adhesion properties of the bond 104, e.g., with a pressure-sensitive adherent and the adhesive 102 that is chemically activated.

For example, the first adhesive layer 156 is an adhesive 102 that has not been activated and contains water molecules to provide a liquid coating applied to the pressure-sensitive adherent throughout the binder 150 and on both sides. The adhesive 102 coating creates a liquid first adhesive layer 156 that deforms continuously when shear stresses are applied to the liquid layer. In effect, the liquid coating with the adhesive 102 modifies the pressure-sensitive adherent in the double-sided binder 150 with a liquid first adhesive layer 156 that controls/delays the activation of the adhesive properties. In other words, the first adhesive layer 156 includes the delayed adhesive 102 described above that forms the bond 104 between the first substrate 106 and the binder 150 and modifies the adhesion of the conventional pressure-sensitive double-sided tape to have a controllable and delayed adhesive 102 within the first adhesive layer 156.

The binder 150 couples to the first adhesive layer 156 and couples directly to the second substrate 108. The binder 150 is interposed between the first substrate 106 and the second substrate 108 to provide different means of coupling the substrates. The adhesive properties in the first adhesive layer define the bond 104 that adheres the first substrate 106 to the binder 150. A different coupling mechanism (e.g., mechanical and/or pressure-sensitive adherent) couples the binder 150 to the second substrate 108, either directly or indirectly. FIG. 5 shows the first adhesive layer 156 on the first side 152 of the binder 150 coupled to the first substrate 106. The binder 150 couples to the second substrate 108 on the second side 154.

Regarding FIGS. 5 and 6, the binder 150 may be a double-sided composite adherend 130 with an alkyl-silane adhesive layer 156/158. The binder 150 may be a double-sided composite binder 160 that binds to either or both the first substrate 106 and the second substrate 108. In FIG. 6, the binder 150 has the first adhesive layer 156 applied to or coated on, the first side 152, and the second adhesive layer 158 applied to or coated on, the second side 154. In contrast to FIG. 5, the binder 150 of FIG. 6 has a first adhesive layer 156 with an activated portion 126 that binds the first side 152 and a second adhesive layer 158 with an activated portion 126 that binds the second side 154. Stated differently, the binder 150 couples to the first substrate 106 with a first adhesive layer and binds to the second substrate 108 with a second adhesive layer 158, which may differ from the first adhesive layer 156.

The differences may include different functional groups in the adhesive 102 and/or different activation of the adhesives 102 on either side, e.g., radiating and/or heating one side differently than the other. The ability to differentiate and control the bonds 104 formed on either side of the binder 150 enhances the design of the joint by customizing the binding area, adhesive properties, and/or activation of each adhesive layer (e.g., the joint has different first and second adhesive layers 156 and 158). This may enhance, facilitate, and/or enable joining different types of substrates, for example, by customizing the chemical functional groups and/or adhesive properties for a material of the first substrate 106 that is different from a material of the second substrate.

Figure 7A:
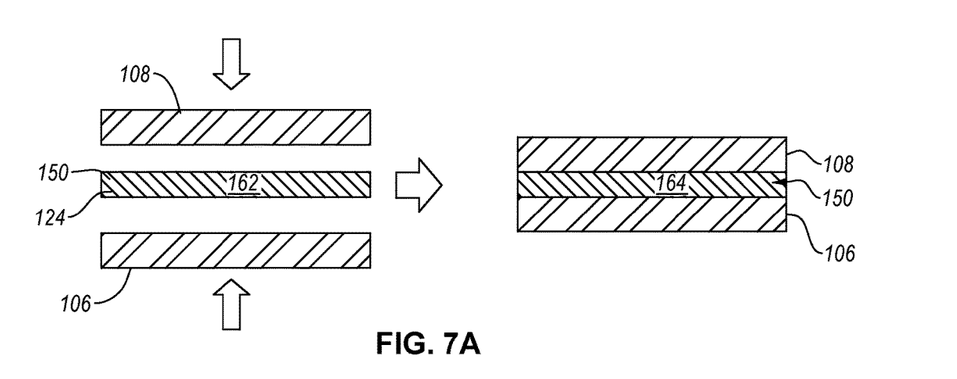
FIG. 7A is a schematic diagram illustrating one embodiment of a delayed adhesion of a double-sided adhesive.
Figure 7B:
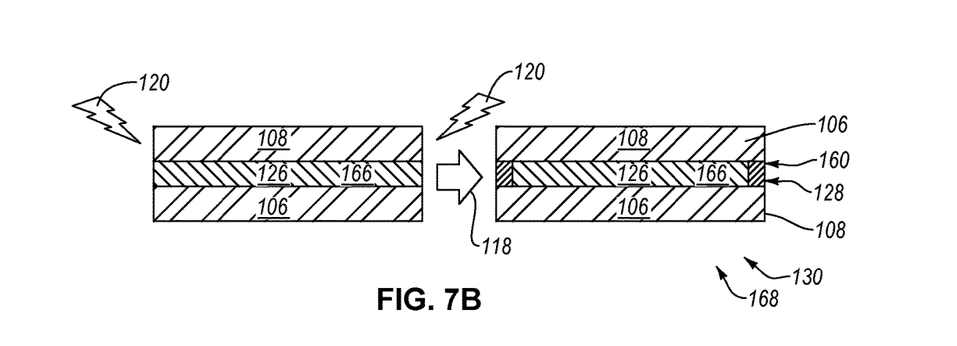
FIG. 7B is a schematic diagram illustrating a promotor/catalyst that enhances and/or accelerates the delayed activation of the adhesion properties of a controlled adhesive, according to one embodiment.
Figure 7C:
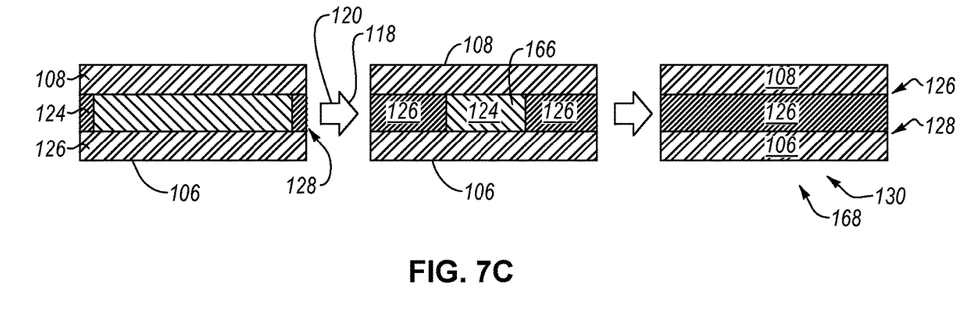
FIG. 7C is a schematic diagram illustrating one embodiment of delayed activation of the double-sided adhesive over time.

FIGS. 7A-7C shows various pathways for the composite adherend 130 joining two substrates. The composite adherend 130 may be on the double-sided binder 150 and/or have delayed adhesive 102, for example, in a continuous coating layer. FIG. 7A shows activation pathways through FIGS. 7B and/or 7C. Specifically, FIG. 7A shows the binder 150 coupling and interposed between the first substrate 106. Various components of the bond 104 formed by the adhesive 102 may provide adhesion properties that enhance the bond 104 for the desired functionality of the apparatus 100. As shown in FIG. 7A, a deactivated adhesive 162 is transformed into an activated adhesive 164 to form the bond 104 with adhesion properties along a continuum. The bond 104 between the binder 150 and the first substrate 106 can differ from the bond 104 between the binder 150 and the second substrate 108. The two sides of the binder 150 enable different adhesives 102 with different adhesion properties on the first side 152 than the second side 154 of a double-sided binder 150.

FIG. 7B shows an activation pathway through photoactivation, such as UV radiation or other radiation. Photoactivation of the perimeter 128 creates a bond 104 with an activated portion 126 and an unactivated portion 124. In some embodiments, the bond 104 created in FIG. 7B is the end-product of the bond 104. In other embodiments, the activation of activated portion 126 shown in FIG. 7C is a promoter of the complete activation of the binder 150 and/or adhesive 102. In FIG. 7B, the adhesive 102 may be controlled to be pressure compliant, such that the bond 104 created by the adhesive 102 is pliable and deforms under pressure.

The pliable bond 104 is created by the interaction of the activated portion 126 and the unactivated portion 124 of the bond 104. For example, the activated portion 126 may be a dehydrated form of adhesive 102 that strongly and/or rigidly binds the substrates. The unactivated portion 124 forms a pliable and weaker bond 104 between the substrates. For example, the activated portion 126 may include covalent bonding, hydrogen bonding, and/or ionic bonding between the substrates and/or the binder 150. Similarly, the unactivated portion 124 may include weaker bonds 104 between the substrates and/or the binder 150, either by reducing the number and/or type of covalent bonds, hydrogen bonds, and/or ionic bonds 104. In embodiments, the unactivated portion 124 may not provide any bonding or adhesion.

FIG. 7B shows a catalyst or promoter 120 for the adhesive 102 reduces the activation energy that converts the unactivated portion 124 into an activated portion 126. In other words, by increasing/decreasing the area/volume of the promoter 120, the ratio of the unactivated portion 124 relative to the activated portion 126 can be controlled to change the flexibility, duration, and/or strength of the bond 104 created by the adhesive 102. As used herein, a catalyst or promoter 120 reduces the activation energy for a chemical reaction that modifies an unactivated portion 124 into an adhering activated portion 126 with stronger adhesion, regardless of whether the promotor is consumed, changed, or otherwise transformed during the chemical reaction. In other words, the promoter 120 reduces the activation energy of the chemical reaction.

When the adhesive comprises a functional group, and the functional group of the adhesive undergoes a chemical change to activate the adhesive 102, the promoter 120 reduces the chemical reaction's activation energy. The reduced activation energy causes the chemical reaction to proceed and transforms the unactivated adhesive 164 to active adhesive 102, e.g., that adheres the second substrate 108 to the first substrate 106. In some embodiments, heat is the promoter 120 that facilitates the chemical change to the functional group of the adhesive 102. In some embodiments, the functional group includes saline and is activated by removing moisture or water. Accordingly, processes that reduce moisture (such as heating and/or radiation) may activate the adhesive 102 to increase the adhesion and the strength of the bond 104. In contrast, processes that increase moisture (e.g., ambient air with water vapor) may inactivate the adhesive 102. In some embodiments, moisture is added to the adhesive 102 to deactivate the adhesive 102 and delay/control the adhesion properties of the adhesive 102.

FIG. 7C illustrates the continuum of the adhesion properties of the adhesive 102 used for controlled development of the bond 104, resulting in the composite adherend 130. In various embodiments, the desired ratios of the unactivated portion 124 relative to the activated portion 126 may be determined before the adhesive 102 is activated. The desired adhesion properties of the bond 104 for the desired function of the joint may be decided before activating any portion of the adhesive 102. In a specific embodiment, a deactivator shown as arrestor 166 may be added to the adhesive 102 prior to applying the adhesive 102 to the substrates and/or the binder 150. The arrestor 166 slows and/or prevents the activation of the adhesive 102. In other words, the arrestor 166 promotes the unactivated portion 124 relative to the activated portion 126 of the adhesive 102 forming the bond 104. In some embodiments, the arrestor 166 is water or moisture added to prevent the dehydration of a functional group in the adhesive 102.

Arrestors 166 can be used during the fabrication, manufacture, and/or assembly of the apparatus 100 and/or may be used to control the adhesive properties of the manufactured joint created by the resultant bond 104. In various examples, the size/volume of the unactivated portion 124 is greater than the activated portion 126. Stated differently, the activated portion 126 is less than the unactivated portion. The unactivated portion 124 may be at least 60%, 70%, 80%, or 90% or more of the size/volume of the bond 104 formed by the partially activated adhesive 164. The activated portion is less than 10%, 20%, 30%, 40%, or less of the bond 104 formed by the adhesive 102. The increased relative ratio of unactivated portion 124 may increase the flexibility of the bond 104 and/or result in a temporary attachment 116 that is more capable of being attached and reattached, for example, during assembly.

The arrestor 166 may be added to the adhesive 102 prior to bonding to control the location, size, and ratio of adhesive 102 activation. In other words, the arrestor 166 is added to retain the relatively greater portion of the unactivated portion 124 compared to the activated portion 126. As long as the arrestor 166 is present in the unactivated portion 124, it remains unactivated and remains greater than the activated portion 126. Time, photo-initiator 118, and/or promoter 120 can retain the desired ratio permanently. Alternatively, the ratio may be maintained only during assembly. Passage of time may reduce the arrestor 166 in the unactivated portion 124 (e.g., dehydrate the unactivated portion 124). The reduction of the arrestor 166 results in a greater proportion of the activated portion 126 over time.

In other embodiments, the size/volume of the unactivated portion 124 is approximately equal to the activated portion 126 in the adhesive. Specifically, the unactivated portion 124 comprises between 40-60%, and the activate portion comprises between 60%-40% of the total size/volume of the adhesive 102 in the bond 104. The roughly equal proportions of the activated portion 126 and the unactivated portion 124 create a bond 104 with moderate flexibility, strength, and/or duration. In this configuration, the proportion may be permanent or may undo changes over time to activate a greater portion of the adhesive 102.

In another embodiment, the size/volume of the unactivated portion 124 is less than the activated portion 126, and the activated portion 126 is greater than the unactivated portion. The activated portion 126 is at least 60%, 70%, 80%, or 90% or more of the size/volume of the bond 104 formed by the partially activated adhesive 164. Stated differently, the unactivated portion 124 is less than 10%, 20%, 30%, 40%, or less of the bond 104 formed by the adhesive 102. The bond 104 formed with these ratios has adhesion properties that are more rigid, firm, strong, and permanent. In one embodiment, the bond 104 is formed with a greater ratio of activated portion 126. The unactivated portion 124 is activated over time as the arrestor 166 is removed or reduced from the adhesive 102 following assembly of the bond 104.

In a specific embodiment, the assembly is performed in the presence of the promoter 120 and/or photo-initiator 118 to activate a part of the adhesive 102, where some portion of the adhesive 102 is activated. In other words, the initial activation of the adhesive 102 is active. A promoter 120 and/or photo-initiator 118 activates some part of the adhesive 102 to form a composite adhesive 102. This partially activated adhesive 164 forms a temporary attachment that facilitates alignment, detachment, and/or reattachment during assembly. Following the assembly of the apparatus 100, the arrestor 166 in the bond 104 is passively removed in the absence of the promoter 120 and the photo-initiator 118. The bond 104 is dehydrated. In other words, the arrestor 166 is entirely removed from the adhesive 102, and the entire bond 104 is activated. The assembler can initially catalyze the adhesive 102 to form the temporary attachment 116 during assembly, while the presence of the arrestor 166 defines the adhesion properties of the bond 104 over time. The arrestor 166 may be entirely removed or partially maintained in the adhesive 102 through time to retain the desirable adhesion properties of the bond 104.

Figure 8:
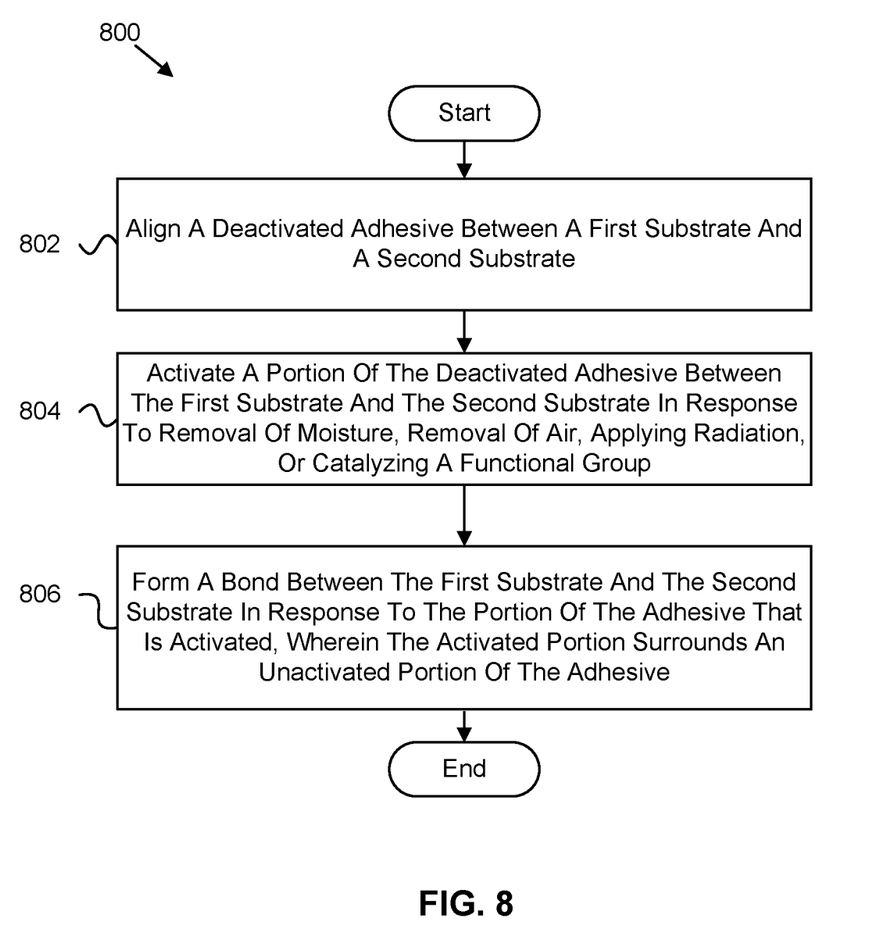
FIG. 8 is a schematic flow chart diagram illustrating one embodiment of a method of bonding substrates with a delayed adhesive.

FIG. 8 shows a method 800 of bonding two or more substrates. The method includes aligning a deactivated adhesive 802 between a first substrate and a second substrate. A portion of the deactivated adhesive is activated 804 between the first substrate and the second substrate in response to the removal of moisture, removal of air, applying radiation, or catalyzing a functional group. A bond 104 is formed 806 between the first substrate and the second substrate in response to the portion of the adhesive that is activated, wherein the activated portion surrounds an unactivated portion of the adhesive.

In various examples, the deactivated adhesive 162 may be applied on both sides (e.g., a first side 152 and a second side 154) of the binder 150 prior to the step of aligning the deactivated adhesive 802 between the first substrate 106 and the second substrate 108. In this embodiment, the deactivated adhesive 162 on both sides of the binder 150 may produce a double-sided binder 150 that is individually aligned 802, applied 804, and/or activated 806 between the first substrate 106 and the second substrate 108. A double-sided binder 150 is created, aligned 802, and activated between the first substrate and the second substrate. The adhesive 102 may be heated, radiated, vacuumed, and/or dehydrated to modify a functional group of the adhesive 102. The activation may occur in a controlled environment. For example, the activation occurs in the presence of carbon dioxide ($CO_2$) or nitrogen ($N_2$) gas or within a vacuum to prevent activation of the adhesive 102. Specifically, since activation causes the adhesive 102 to undergo a chemical change, heating, drying, and/or radiating may activate the adhesive 102. The use of a vacuum or gas reduces the possibility of functional groups in the adhesive 102 reacting with the surrounding environment. For example, a water-sensitive adhesive 102 (e.g., activated by drying and/or removing moisture) may be applied in a gas environment and/or a vacuum to prevent drying of the functional groups and/or reaction with the air. This helps control when/where the chemical changes occur in the adhesive 102 when heated, radiated, and/or dried.

Similarly, the adhesive 102 may be promoted by radiation. For example, the adhesive 102 is radiated about the perimeter 128 to activate the perimeter 128 through exposure to the radiation. The unactivated portion 124 may remain shielded from the radiation about the perimeter 128. For example, the activated perimeter 128 may shield the unactivated portion 124 in part from the radiation. In some examples, only a portion of the adhesive 102 is activated, and an unactivated portion 124 of adhesive 102 remains.

In some examples, the perimeter 128 is activated initially, and the unactivated portion 124 of the adhesive 102 is greater than the activated portion 126 of the adhesive 102. Following forming the bond 104, the volume of the unactivated portion 124 relative to the activated portion 126 may change. Following bonding, the unactivated portion 124 in the adhesive 102 may activate and convert to activated portions 126. In other words, the unactivated portion 124 within the perimeter 128 is shielded from the radiation at least in part by the activated portion 126 extending about the perimeter 128. Accordingly, only a portion of the adhesive 102 is activated portion 126, and the unactivated portion 124 of the adhesive is, at least initially, greater than the activated portion 126 of the adhesive 102.

For example, the removal of moisture may activate the unactivated portion 124. As the unactivated portion 124 dries, the proportion of the activated portion 126 to the unactivated portion 124 changes until the size/volume equals or exceeds the activated portion 126. This enables a user to design the flexibility and/or time of the bond 104 formed by the adhesive 102.

In one example, the adhesive 102 may be pressure compliant. For example, the adhesive 102 may form a flexible material 168, such as a composite adherend and/or a composite binder 160. The flexible material 168 may include the unactivated portion 124 in greater amounts than the activated portion 126, following bonding and/or time passage. In other words, the unactivated portion 124 of a moisture sensitive adhesive 102 may by sealed about the perimeter 128 to prevent the escape of moisture and limited the activation of the unactivated portion 124. The combination of unactivated portion 124 inside the bond 104 formed by the adhesive 102 and the activated portion 126 about the perimeter 128 may create a flexible bond 104 due to the load interactions of the activated portion 126 with the unactivated portion 124 of the adhesive 102.

In another example, the adhesive 102 may form the permanent joint 114 in an inflexible structure to permanently and/or rigidly bond 104 the first substrate 106 to the second substrate 108. For example, to form the permanent joint 114 moisture is gradually removed after the bond 104 is formed. In some embodiments, the adhesive 102 begins as a flexible and/or temporary attachment 116 with an unactivated portion 124 that is greater than the activated portion 126. This facilitates alignment and realignment of the first substrate 106 relative to the second substrate 108. Then, gradually the moisture in the unactivated portion 124 dries/evaporates after the initial bond 104 is formed between the first substrate 106 and the second substrate 108. Removing moisture or drying, for example by exposing the apparatus 100 to the ambient environment and allowing it to dry over time, the unactivated portion 124 transforms in activated portion 126 until an entirety of the adhesive 102 provides adhesion and is activated.

Figure 9:
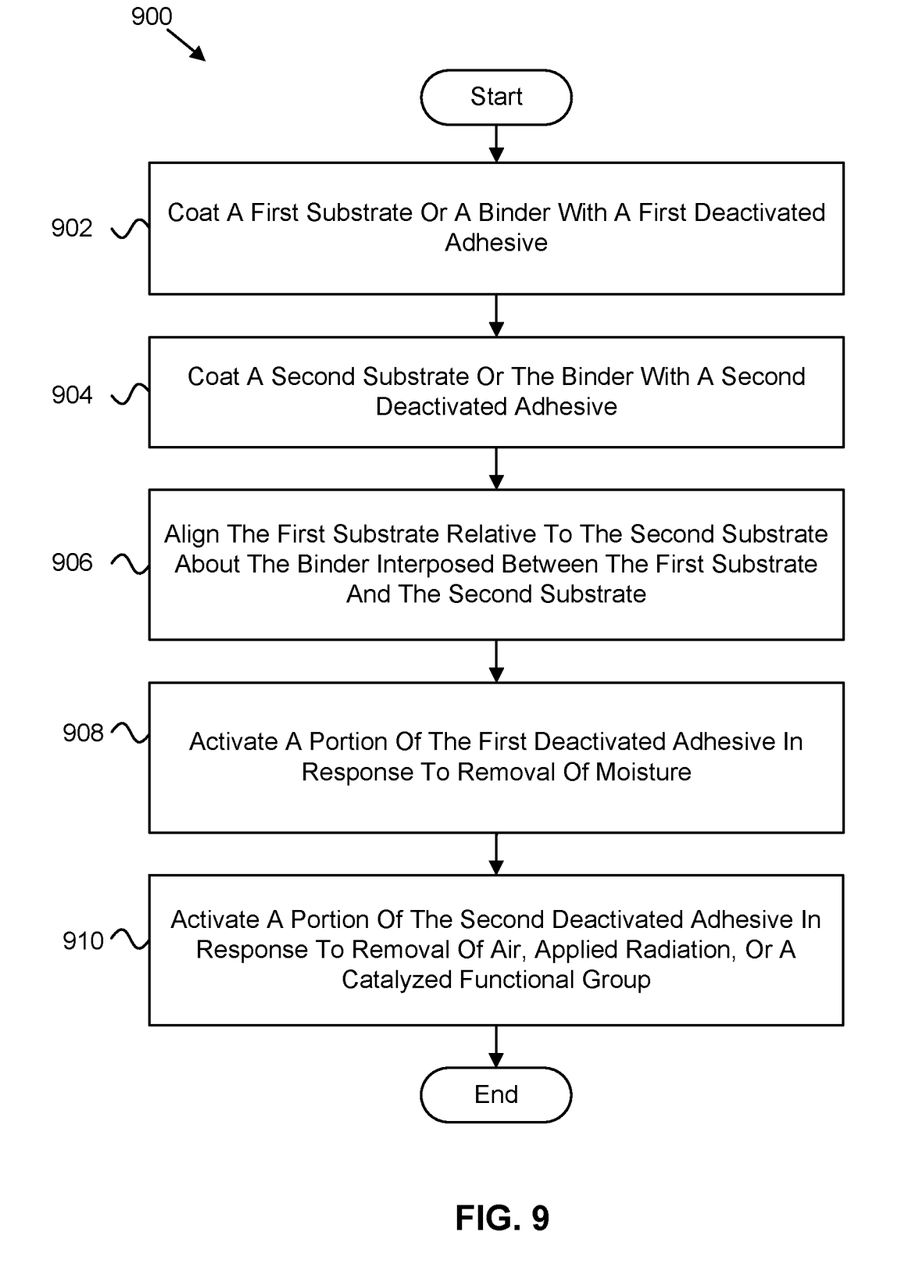
FIG. 9 is a schematic flow chart diagram illustrating another embodiment of method of bonding two or more substrates with a delayed adhesive.

FIG. 9 shows another method 900 of bonding different parts or components (e.g., the first substrate 106 and the second substrate 108) of a pressure compliant assembly or apparatus 100. Method 900 bonds two substrates (e.g., first substrate and the second substrate 108) about a binder 150. The first substrate 106 and/or the binder 150 is coated 902 with a first deactivated adhesive 162A and the second substrate 108 and/or the binder 150 is coated 904 with a second deactivated adhesive 162B. The first substrate 106 is aligned 906 relative to the second substrate 108 about the binder 150 interposed between the first substrate 106 and the second substrate 108. A portion of the first deactivated adhesive 162A is activated 908 in response to removal of moisture from the first deactivated adhesive 162A. A portion of the second deactivated adhesive 162B is activated 910 in response to removal of air, applying radiation, or catalyzing a functional group of the second deactivated adhesive 162B.

In various embodiments, the substrate 106/108 is a frame 112 that supports a keyboard 110 (e.g., the second substrate 108), and method 900 includes heating the keyboard 110 to activate the adhesive 102 on the frame 112. Similarly, the substrate 106/108 may be a frame 112 that supports a screen 132, and method 900 includes holding the screen adjacent to an area of the coated and/or activated second substrate 108 to permanently affix the screen 132 on and/or within the frame 112.

Apparatuses, methods, systems, and program products are disclosed for controlled and/or delayed adhesive activation. In one embodiment, an apparatus having a first substrate and a second substrate is described. An adhesive comprising an activated portion and an unactivated portion is interposed between the first substrate and the second substrate. The unactivated portion comprises moisture and the activated portion is activated portion is active in response to removal of moisture. The activated portion couples and adheres to at least one of the first substrate and the second substrate.

In various embodiments, the activated portion extends along a perimeter and surrounds the unactivated portion of the adhesive and the unactivated portion is greater than the activated portion of the adhesive. In various embodiments, the activated portion is activated in response to removal of moisture, removal of air, applying radiation, or catalyzing a functional group.

In some embodiments, the adhesive includes a binder interposed between the first substrate and the second substrate. The binder comprises a first side comprising the activated portion and the unactivated portion and a second side comprising a second activated portion and a second unactivated portion.

In embodiments, the first substrate is one of a keyboard or a screen and the second substrate is a frame supporting the keyboard or the screen. The adhesive is interposed between and supports the frame to one of the keyboard or the screen.

In various embodiments, the adhesive is pressure compliant and forms a flexible material due to an interaction of the activated portion with the unactivated portion of the adhesive. For example, the adhesive is catalyzed by radiation, and the perimeter of the activated portion of the adhesive is activated through exposure to radiation and the unactivated portion is shielded from radiation, e.g., UV radiation. The adhesive may comprise silane that has a functional group that is deactivated in the presence of water.

In various embodiments, the adhesive comprises a functional group and the functional group of the adhesive undergoes a chemical change to activate the adhesive. For example, heat may be a promotor to facilitate the chemical change to the functional group of the adhesive. In other examples, moisture is gradually removed and/or dried over time in response to the adhesive being bonded to the first substrate and the second substrate. In some examples, the volume of the activated portion grows relative to the unactivated portion until there is no moisture left in the adhesive.

In one embodiment, a method of joining first substrates is described. The method involves aligning a deactivated adhesive between a first substrate and a second substrate and activating a portion of the deactivated adhesive between the first substrate and the second substrate in response to removal of moisture, removal of air, applying radiation, or catalyzing a functional group. A bond is formed between the first substrate and the second substrate in response to the portion of the adhesive that is activated, such that the activated portion surrounds an unactivated portion of the adhesive.

In various embodiments, the method further includes applying the deactivated adhesive on both sides of a binder to produce a double-sided binder that is aligned and activated between the first substrate and the second substrate. The method may include heating the adhesive to catalyze a functional group of the adhesive that undergoes a chemical change and activates the adhesive when heated. The method may include radiating the adhesive. The adhesive may be catalyzed by the radiation so that a perimeter of the adhesive is activated through exposure to radiation and an unactivated portion is shielded from the radiation.

In various embodiments, only a portion of the adhesive may be activated such that there is an unactivated portion of adhesive. The unactivated portion of the adhesive may be greater than the activated portion of the adhesive. The adhesive may be pressure compliant and/or form a flexible material due to an interaction of the activated portion with the unactivated portion of the adhesive.

In one embodiment, a method of bonding substrates is described. The method includes coating a first substrate or a binder with a first deactivated adhesive and coating a second substrate or the binder with a second deactivated adhesive. The first substrate is aligned relative to the second substrate about the binder interposed between the first substrate and the second substrate. A portion of the first deactivated adhesive is activated in response to removal of moisture and a portion of the second deactivated adhesive is activated in response to removal of air, applying radiation, or catalyzing a functional group.

In one embodiment a method of bonding substrates is disclosed. The method includes coating the first substrate and/or the binder with a first deactivated adhesive and coating the second substrate and/or the binder with the second deactivated adhesive. The first substrate is aligned relative to the second substrate about the binder, which is interposed between the first substrate and the second substrate. A portion of the first deactivated adhesive is activated in response to removal of moisture and a portion of the second deactivated adhesive is activated in response to removal of air, applying radiation, or catalyzing a functional group. A portion of the coated substrates may be activated in response to the removal of moisture, removal of air, applying radiation, or catalyzing a functional group when the substrates are properly aligned. Initially or permanently, the unactivated portion may be greater than the activated portion and/or the activated portion may surround the unactivated portion of the adhesive.

In one embodiment, the first substrate is a frame that supports the second substrate that is a keyboard or a screen. The method includes heating the keyboard or the screen in a vacuum to activate the adhesive on the frame. In another example, the second substrate is a frame that supports a screen and the method further comprises holding the screen to an area of the coated and activated second substrate to permanently affix the screen on the frame.

In one embodiment, the step of activating the portion of the coated first substrate includes one or more steps of heating, chemically activating, or radiating the adhesive, e.g., with ultraviolet (UV) radiation.

In various embodiments, the portion of the coated second substrate is activated in a vacuum surrounding the first substrate, such that a pressure between the coated second substrate and the first substrate is reduced below atmospheric pressure when the portion of the coated second substrate is activated. In one embodiment, the activated portion of the adhesive undergoes a chemical reaction to remove moisture from the portion of the coated second substrate with an activated adhesive and binding the second substrate to the first substrate.

As will be appreciated by one skilled in the art, aspects of the embodiments may be embodied as a system, method, or a process. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. One skilled in the relevant art will recognize that embodiments may be practiced without one or more of the specific details, or with other methods, first substrates, materials, and so forth. In other instances, well-known structures, materials, or operations are not shown or described in detail to avoid obscuring aspects of an embodiment.

Aspects of the embodiments are described with reference to schematic flowchart diagrams and/or schematic block diagrams of methods, apparatuses, systems, and processes according to various embodiments.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of the apparatus.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of joining substrates, the method comprising:
    aligning a deactivated adhesive between a first substrate and a second substrate;
    activating a portion of the deactivated adhesive between the first substrate and the second substrate by removing moisture, removing air, applying radiation, or catalyzing a functional group; and
    forming a bond between the first substrate and the second substrate after the adhesive is activated, wherein the activated portion surrounds an unactivated portion of the adhesive.

2. The method of claim 1, further comprising applying the deactivated adhesive on both sides of a binder prior to aligning the deactivated adhesive between the first substrate and the second substrate, wherein the deactivated adhesive on both sides of the binder produces a double-sided binder that is individually aligned and activated between the first substrate and the second substrate.

3. The method of claim 1, further comprising heating the adhesive in a vacuum, wherein a functional group of the adhesive undergoes a chemical change that activates the adhesive when heated.

4. The method of claim 1, further comprising radiating the adhesive, wherein the radiation activates the adhesive, and wherein a perimeter of the adhesive is activated through exposure to radiation and the unactivated portion within the perimeter is shielded from radiation at least in part by the activated portion about the perimeter.

5. The method of claim 1, wherein only a portion of the adhesive is activated such that the unactivated portion of the adhesive is larger than the activated portion of the adhesive.

6. The method of claim 1, further comprising removing moisture from the adhesive after the bond is formed between the first substrate and the second substrate until an entirety of the adhesive is activated.

7. A method of bonding substrates, comprising:
    coating a first substrate or a binder with a first deactivated adhesive;
    coating a second substrate or the binder with a second deactivated adhesive;
    aligning the first substrate relative to the second substrate with the binder interposed between the first substrate and the second substrate;
    activating a portion of the first deactivated adhesive by removal of moisture; and
    activating a portion of the second deactivated adhesive by removing air, applying radiation, or catalyzing a functional group.

8. The method of claim 7, wherein the first substrate is a frame that supports the second substrate that is a keyboard or a screen, and wherein the method further comprises heating the keyboard or the screen in a vacuum to activate the adhesive on the frame.

9. The method of claim 7, wherein the first substrate is a frame that supports the second substrate that is a screen, and wherein the method further comprises holding a portion of the screen against an area of the coated and activated first substrate to permanently affix the screen in the frame.

10. The method of claim 7, wherein the step of activating the portion of the coated first substrate further includes one or more steps of heating, vacuuming, chemically catalyzing, or radiating the adhesive.

11. The method of claim 7, wherein the portion of the coated first substrate is activated in a vacuum surrounding the second substrate, such that a pressure between the coated first substrate and the second substrate is reduced below atmospheric pressure when the portion of the coated first substrate is activated.

12. The method of claim 7, wherein the activated portion of the adhesive undergoes a chemical reaction to remove moisture from the portion of the coated first substrate with an activated adhesive and binding the first substrate to the second substrate.

* * * * *